CIRCUITRY UTILIZING PARAMETRICALLY EXCITED HARMONIC OSCILLATORS

Filed Nov. 9, 1959 3 Sheets-Sheet 1

INVENTOR.
OTTO A. JORGENSEN
BY Robert L. Nathans
ATTORNEY

July 30, 1963 O. A. JORGENSEN 3,099,801

CIRCUITRY UTILIZING PARAMETRICALLY EXCITED HARMONIC OSCILLATORS

Filed Nov. 9, 1959 3 Sheets-Sheet 2

CIRCUITRY UTILIZING PARAMETRICALLY EXCITED HARMONIC OSCILLATORS

Filed Nov. 9, 1959 3 Sheets-Sheet 3

3,099,801

CIRCUITRY UTILIZING PARAMETRICALLY EXCITED HARMONIC OSCILLATORS

Otto A. Jorgensen, Pittsford, N.Y., assignor to General Dynamics Corporation, Rochester, N.Y., a corporation of Delaware Filed Nov. 9, 1959, Ser. No. 851,569
9 Claims. (Cl. 330—10)

The present invention relates to circuitry utilizing parametrically excited harmonic oscillators and more particularly amplifiers and demodulators utilizing these oscillators.

There has been a need in the field of electronics for a simple and inexpensive high gain, low noise, amplifier which is capable of being subjected to wide temperature and frequency ranges and which may be subjected to considerable shock. Amplifiers utilizing both electron tubes and semi-conductor devices possess drawbacks along these lines. A parametrically excited harmonic oscillator comprises a resonant tank circuit having means for periodically varying the value of the inductor or the capacitor at twice the natural resonant frequency of the tank circuit so that parametric oscillations are built up within the tank circuit at its natural frequency. This action is analogous to raising the load carried by a swing upwards each time it crosses the midpoint of motion of the swing in the direction of movement of the swing, thereby to progressively increase its amplitude of motion. It can be demonstrated that the magnitude of the envelopes of the aforementioned parametric oscillations may be varied in proportion to the magnitude of a D.C. voltage impressed across the tank circuit at the instant when the oscillations are initiated. The fact that these parametric oscillations rise to exceedingly large amplitudes relative to the D.C. voltage which controls them suggests the use of parametrically excited harmonic oscillators in amplifiers.

Accordingly, it is a principal object of the present invention to provide new and improved circuitry utilizing parametrically excited harmonic oscillators.

It is a further object of the present invention to provide new and improved amplifier circuits which possess simplicity, linearity, high gain, low noise characteristics, a wide frequency range, and the capability of tolerating very wide temperature ranges and severe shock conditions.

It is a further object of the present invention to provide a new and improved demodulator having the characteristics of the aforementioned amplifier.

It is a feature of the present invention to provide means for periodically inducing parametric oscillations in a resonant tank circuit together with means for impressing a variable signal across the tank circuit to vary the degree of the parametric oscillations induced in the tank circuit and means for rectifying and filtering the parametric oscillations to recover the original variable signal.

Further objects, features and advantages of the invention will become apparent as the following description proceeds and features of novelty which characterize the invention will be pointed out with particularity in the claims annexed to and forming a part of this specification.

Figure 1:
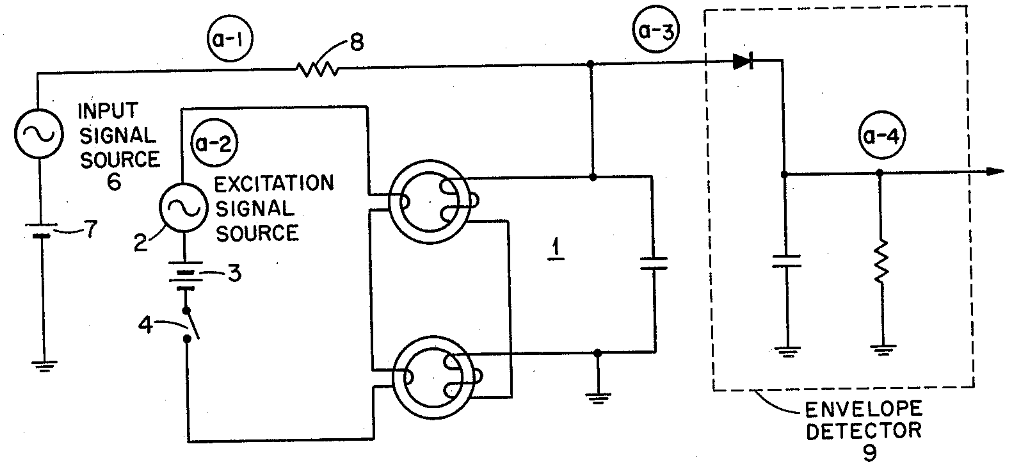
Figure 2:
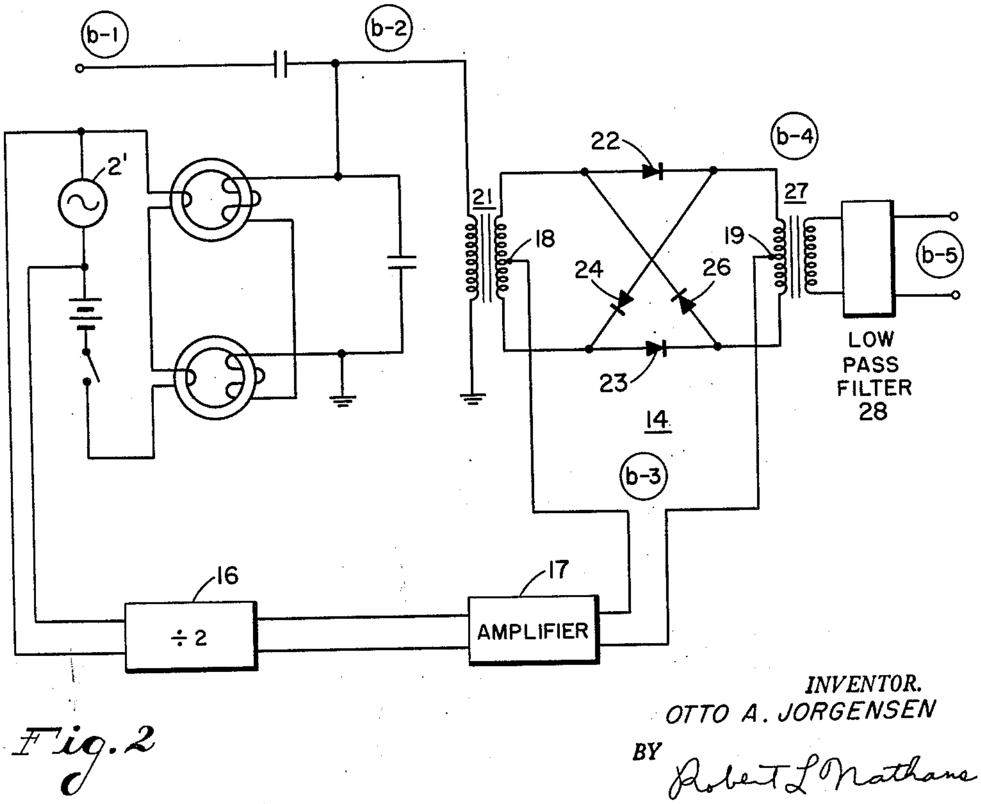
Figure 3:
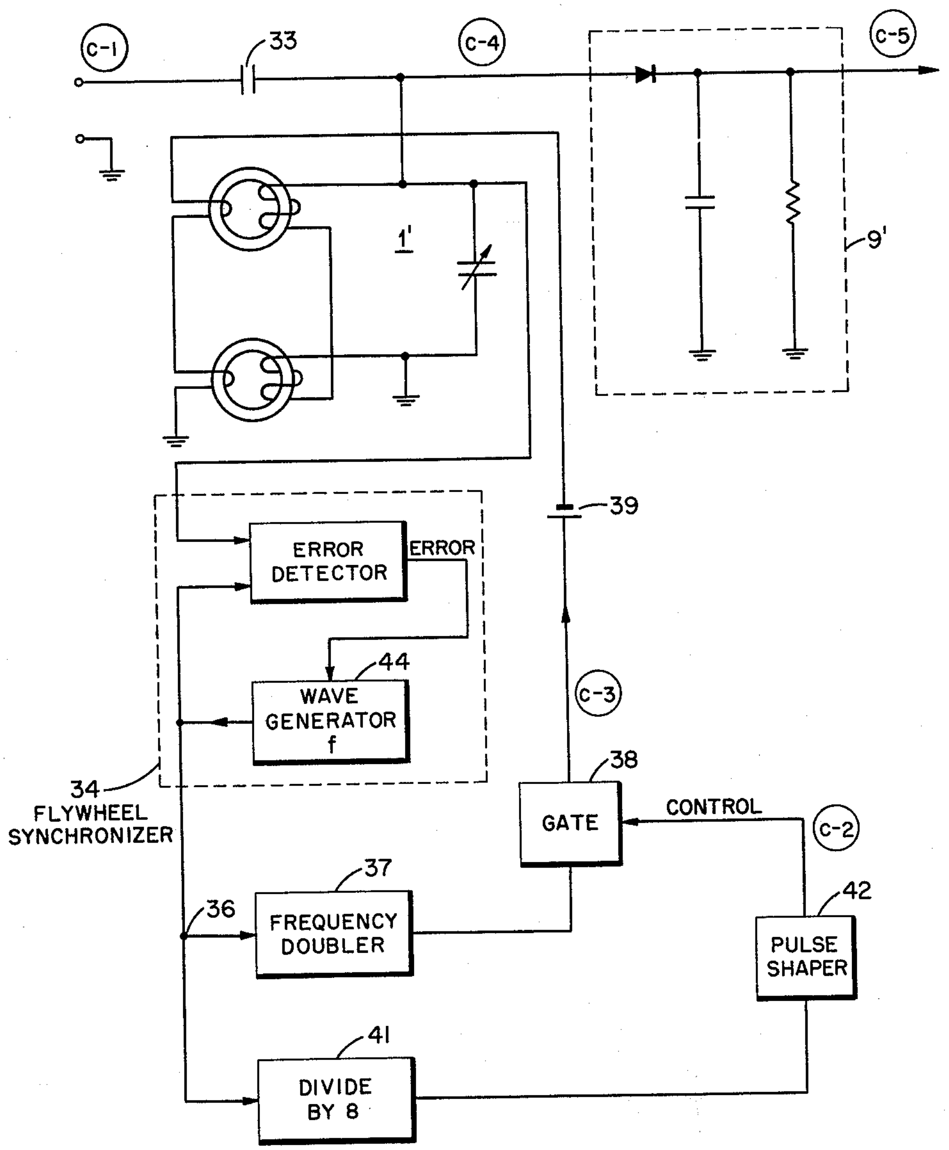

For a better understanding of the invention, reference may be had to the accompanying drawings in which:

FIG. 1 discloses a first amplifying circuit of the present invention;

FIG. 2 discloses a second amplifying circuit of the present invention;

FIG. 3 discloses a demodulating circuit of the present invention; and

Figure 4:
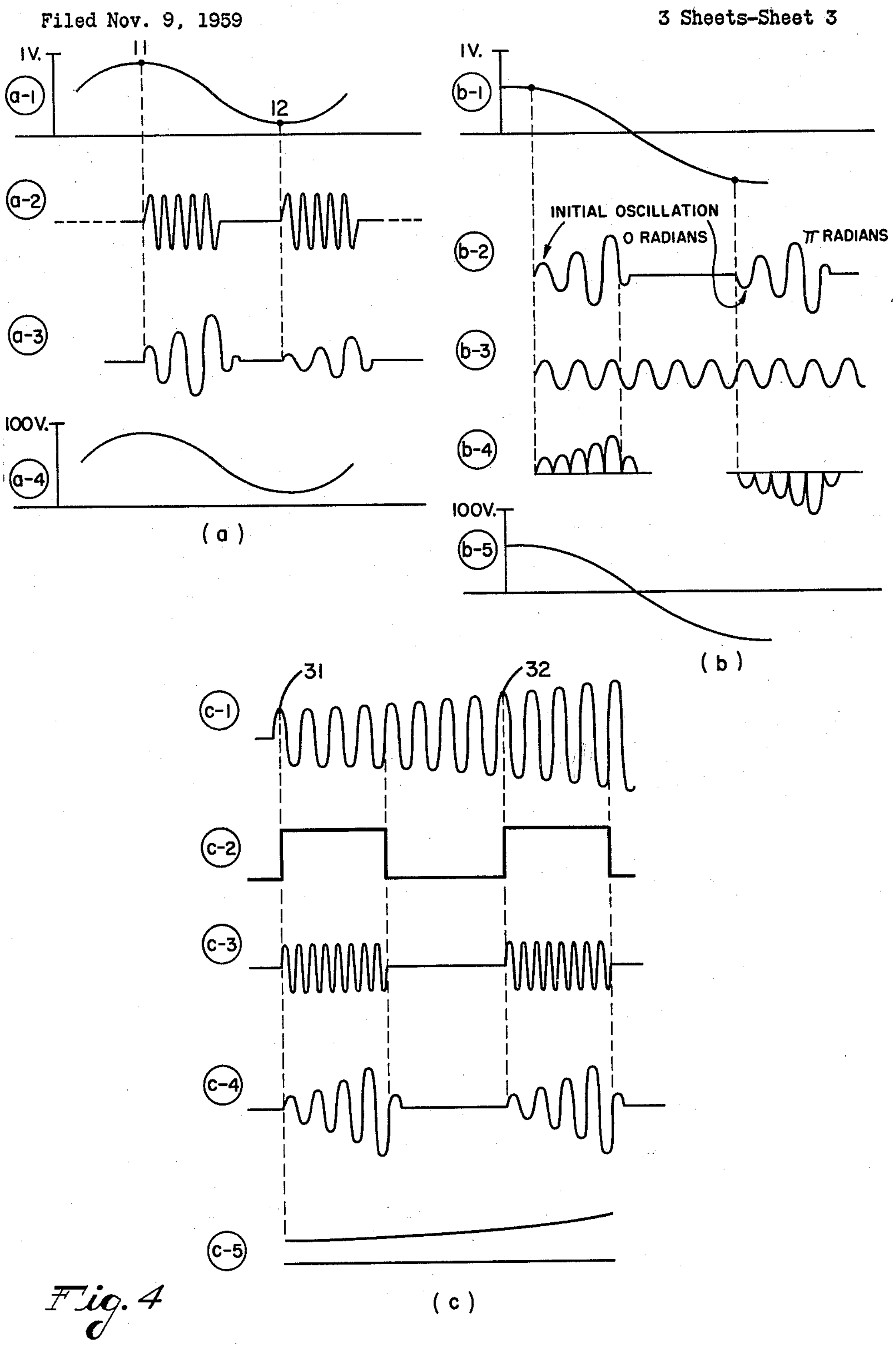

FIG. 4 discloses pulse diagrams which will be helpful in the understanding of the embodiments of the invention disclosed in FIGS. 1–3.

Reference will now be had to FIG. 1 which discloses an amplifier having a resonant tank circuit 1 which is periodically excited by a signal produced by excitation signal source 2 and battery 3. The periodic opening and closing of switch 4 causes the excitation of resonant tank circuit 1 to be intermittent in nature. If the resonant frequency of the tank circuit is represented by F, the frequency of the excitation signal is customarily 2F. Upon the application of the excitation frequency to the resonant tank circuit, parametric oscillations are eventually built up within the tank circuit thereby to produce a voltage waveform across the circuit which may be represented by *a*–3 of FIG. 4. The aforementioned circuitry is described in a paper by Ei Ichi Goto, entitled "The Parametron, A Digital Computing Element Which Utilizes Parametric Oscillation," which has been published in Proceedings of the IRE of August, 1959. Input signal source 6 is connected in series with D.C. battery 7, resistor 8, and the resonant tank circuit 1 so that an A.C. signal to be amplified is converted into a fluctuating D.C. signal and applied across tank circuit 1. It has been found that the sizes of the envelopes of the bursts of parametric oscillations induced in tank circuit 1 may be varied by changing the D.C. voltage impressed across the resonant tank circuit. This is so because the amplitude of the initial parametric oscillation induced in the tank circuit at the beginning of each excitation period will be proportional to the amplitude of the D.C. signal impressed across the tank circuit. Since the process is superregenerative, the greater the amplitude of the initial parametric oscillation, the greater the size of the envelope of each burst of parametric oscillations. By coupling the resonant tank circuit to a conventional envelope detector 9, the original input signal produced by source 6 will be recovered in greatly amplified form. The fluctuating D.C. signal, which is impressed across resonant tank circuit 1, is represented at *a*–1 in FIG. 4. The intermittent excitation voltage is represented by the waveshape of *a*–2 of FIG. 4 and the resulting parametric oscillation is represented by the waveform of *a*–3 of the same figure. It should be noted that the frequency of the excitation signal is twice the frequency of the parametric oscillation induced in the tank circuit. Since the fluctuating D.C. signal has a greater amplitude at point 11 than at point 12, the envelope of the second burst of parametric oscillations is smaller than the envelope of the first burst. Again, this is because the "push" given to the resonant tank circuit by the instantaneous voltage represented by point 11 is considerably greater than the "push" given to the resonant tank circuit by the voltage represented by point 12. Envelope detector 9 recovers the original signal in greatly amplified form as shown at *a*–4 of FIG. 4. Because the parametric oscillations may have exceedingly high voltage swings, the gain of the amplifier disclosed in FIG. 1 may be 50 or more. Since no thermal elements or semi-conductors are utilized, there is virtually no noise introduced by the circuit.

The conversion of an A.C. input signal to be amplified into a fluctuating D.C. voltage to be impressed across the resonant tank circuit may be undesirable under certain circumstances. The application of an A.C. signal to be amplified directly across the resonant tank circuit of the embodiment disclosed in FIG. 1 might under certain conditions result in an inoperative device because the circuit would be incapable of distinguishing a positive input voltage from a negative input voltage. As discussed in the aforementioned article by Mr. Goto, the first half of the initial parametric oscillation will be negative-going in the event that a negative D.C. voltage exists across the tank circuit when excitation is applied, and the first half of the initial parametric oscillation will be positive-going upon the application of positive D.C. voltage across the resonant tank circuit when excitation is applied. This action is shown by waveforms *b*–1 and *b*–2 of FIG. 4. The initial parametric oscillation of the left-hand burst of parametric oscillations is positive-going because the D.C. voltage impressed across the resonant tank circuit upon the initiation of excitation is positive. On the other hand, the first half of the initial parametric oscillation of the right-hand burst of parametric oscillations is negative-going because the D.C. voltage impressed across the resonant tank circuit upon the initiation of excitation is negative.

Envelope detector 9 of FIG. 1 would be incapable of detecting the difference between the two bursts of parametric oscillations of *b*–2 of FIG. 4, which are 180° out of phase with one another, and accordingly the input signal of *b*–1 would not be recovered by the detector. This phase difference is detected by feeding the parametric oscillations into a controlled rectifier 14 which is capable of distinguishing between a parametric oscillation of zero radians and a parametric oscillation of $\pi$ radians. The controlled rectifier may be a conventional balanced ring-type demodulating circuit utilizing two pairs of oppositely poled diodes. The signal produced by excitation signal source 2′ is transmitted to points 18 and 19 of ring demodulator 14 through a conventional frequency divider 16 and an amplifier 17. Amplifier 17 amplifies the A.C. signal produced at the output terminals of frequency divider 16, so that the amplitude of the A.C. signal applied to points 18 and 19 is considerably greater than the signal introduced into controlled rectifier 14 by transformer 21. Satisfactory results were obtained where the control signals applied to points 18 and 19 of controlled rectifier 14 were greater than the signal introduced into the controlled rectifier 14 by transformer 21. When point 18 of controlled rectifier 14 is positive with respect to point 19, the signal present across the secondary winding of transformer 21 is passed through the controlled rectifier directly via diodes 22 and 23. When point 18 is negative with respect to point 19, diodes 24 and 26 are rendered conductive rather than diodes 22 and 23 and the signal produced across the secondary winding of transformer 21 is inverted as it passes through rectifier 14. As a result, the waveform of *b*–4 of FIG. 4 is produced across the primary windings of transformer 27. The waveform of *b*–3 represents the signal applied to points 18 and 19. Lowpass filter 28 provides for the recovery of the original A.C. input signal (of *b*–1) in greatly amplified form (*b*–5). Since the resonant tank circuits of the amplifiers of FIGS. 1 and 2 may be operated at extremely high frequencies; the frequency range of these amplifiers is considerable.

FIG. 3 discloses a circuit for demodulating an A.M. carrier wave, represented at *c*–1 of FIG. 4, which is introduced across resonant tank circuit 1′ of FIG. 3 through coupling capacitor 33. The circuit provides means for initiating excitation of resonant tank circuit 1′ at the peak of every eighth carrier wave so that the polarity problem discussed in connection with FIGURES 1 and 2 is avoided. A conventional type flywheel synchronizer which is well known in the television and servocontrol fields is provided to generate the basic clock pulse train having the same frequency as the carrier wave and being synchronized with it. The basic clock pulse train which is continually produced at point 36 is doubled by frequency doubler 37 and is applied to the input circuit of gate 38, the output circuit of which is coupled to the excitation windings of the tank circuit through a D.C. battery 39. Point 36 is also coupled to the control terminal of gate 38 through frequency divider 41 and pulse shaper 42. The purpose of frequency divider 41 and pulse shaper 42 is to produce a train of gating pulses represented by waveshape disclosed at *c*–2 of FIG. 4.

Pulse shaper 42 could be a monostable multivibrator. The output circuit of frequency doubler 37 is coupled to the excitation windings of the tank circuit 1′ through gate 38 just after the occurrence of the leading edge of the control pulse of the waveform shown at *c*–2 in FIG. 4. As a result, the tank circuit 1′ is excited at a time coincident with the occurrence of peak amplitude 31 of the carrier wave shown at *c*–1 in FIG. 4. Due to the action of frequency divider 41 and pulse shaper 42, this sampling process is again initiated at point 32 of *c*–1 but not before. The natural frequency of tank circuit 1′ will be the same as the frequency of the carrier introduced through coupling capacitor 33 and as a result, the frequency of the parametric oscillations will control the frequency of wave generator 44 of flywheel synchronizer 34. Therefore, the signal produced by the aforementioned wave generator will have the same frequency as the frequency of the A.M. carrier wave introduced through coupling capacitor 33 and will be synchronized with it. Any variation between the frequency of the signal produced by wave generator 44 of flywheel synchronizer 34 at point 36 and the frequency of the carrier wave will be immediately corrected by the conventional feedback arrangement. Since the A.M. carrier wave is periodically sampled at recurring peaks of the wave, changes of the amplitudes of these peaks will result in changes of the size of the envelope of the parametric oscillations induced in the resonant tank circuit as in the embodiments of FIGS. 1 and 2. Envelope detector 9′ will complete the demodulation process as in the embodiment of FIG. 1. The result is the amplified waveform of *c*–5 of FIG. 4, which corresponds to the envelope of the carrier of *c*–1. Of course, the values of the capacitor and/or the inductance of resonant tank circuit 1′ may be readily changed to accommodate various carrier frequencies. It should be obvious that every fourth or every sixteenth wave of the A.M. carrier may be sampled by altering frequency divider 41 and it is also obvious that virtually any type of detector may be utilized in connection with the embodiments of the invention disclosed in FIGS. 1 and 3.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. In combination, a resonant circuit, means for inducing bursts of parametric oscillations in said resonant circuit, a source of variable analog input signals having a frequency lower than the resonant frequency of said resonant circuit, means coupling said source of input signals to said resonant circuit for controlling the amplitudes of said parametric oscillations in said resonant circuit depending upon the strength of said input signals, and a detector coupled to said resonant circuit for recovering the input signals in amplified form.

2. In combination, a resonant circuit, means for inducing bursts of parametric oscillations in said resonant circuit, a source of varying D.C. signal potential having a frequency lower than the resonant frequency of said resonant circuit, means coupling said source of varying D.C. signal potential to said resonant circuit for controlling the amplitudes of parametric oscillations induced therein, and a detector coupled to said resonant circuit for recovering the varying D.C. signal potential in amplified form.

3. In combination, a resonant circuit, an A.C. signal source for producing an A.C. signal having a frequency lower than the resonant frequency of said resonant circuit, means for inducing bursts of parametric oscillations in said resonant circuit, means including said A.C. signal source for varying the amplitudes of said parametric oscillations periodically induced in said resonant circuit in proportion to the amplitudes of the signals produced by said A.C. signal source and for varying the phase of said parametric oscillations depending upon the instantaneous polarity of said signals, means for rectifying said parametric oscillations having a first phase and for rectifying and inverting said parametric oscillations having a second phase, and means coupled to said last named means for recovering the input signal produced by said A.C. signal source in amplified form.

4. The combination as set forth in claim 3 wherein means are provided for synchronizing the operation of said means for rectifying and said means for inducing bursts of parametric oscillations in said resonant circuit.

5. The combination as set forth in claim 3 wherein said means for rectifying comprises a ring modulator.

6. In combination, a source of fluctuating voltage, a resonant circuit, means for inducing bursts of parametric oscillations in said resonant circuit substantially coincident with the occurence of every Nth peak of said fluctuating voltage where N is an integer, means for coupling said source of fluctuating voltage to said resonant circuit and for controlling the amplitudes of said parametric oscillations depending upon the amplitudes of the signals produced by said source of fluctuating voltage when said parametric oscillations are induced in said resonant circuit, and a detector coupled to said resonant circuit for recovering the input signals produced by said source of fluctuating voltage in amplified form.

7. The combination as set forth in claim 6 wherein said means for inducing bursts of parametric oscillations further comprises means controlled by said source of fluctuating voltage for producing an excitation signal, a gate for introducing said excitation signal into said resonant circuit, and means controlled by said source of fluctuating voltage for periodically opening and closing said gate in order to induce bursts of parametric oscillations in said resonant circuit.

8. In combination, an A.C. signal source, a resonant circuit, means for inducing bursts of parametric oscillations in said resonant circuit substantially coincident with the occurrence of every Nth peak of the A.C. signal produced by said A.C. signal source, means for coupling said A.C. signal source to said resonant circuit to control the amplitudes of said parametric oscillations depending upon the amplitudes of the signals produced by said A.C. signal source when said parametric oscillations are induced in said resonant circuit, and a detector coupled to said resonant circuit for reproducing the signal produced by said A.C. signal source in amplified form.

9. The combination as set forth in claim 8 wherein said means for inducing bursts of parametric oscillations further comprises means controlled by said A.C. signal source for producing an excitation signal, a gate for introducing said excitation signal into said resonant circuit, and means controlled by said A.C. signal source for periodically opening and closing said gate in order to induce bursts of parametric oscillations in said resonant circuit.

References Cited in the file of this patent

UNITED STATES PATENTS

| | | |
|---|---|---|
| 1,884,845 | Peterson | Oct. 25, 1932 |
| 2,541,060 | Hester et al. | Feb. 13, 1951 |
| 2,719,223 | Ban Der Ziel et al. | Sept. 27, 1955 |
| 3,069,632 | Sterzer | Dec. 18, 1962 |

FOREIGN PATENTS

| | | |
|---|---|---|
| 778,883 | Great Britain | July 10, 1957 |

OTHER REFERENCES

Publication: Proceedings of the IRE, June 1958, pages 1300–1301, "Parametric Amplification of the Fast Electron Wave, by Adler.